United States Patent [19]

Kawabata et al.

[11] Patent Number: 5,734,481
[45] Date of Patent: Mar. 31, 1998

[54] COPYING APPARATUS FOR CARRYING OUT A COPYING OPERATION BETWEEN AN ACTIVE SECTION AND A STAND-BY SECTION

[75] Inventors: Hiromi Kawabata; Yutaka Takeda, both of Tokyo, Japan

[73] Assignee: NEC Corporation, Tokyo, Japan

[21] Appl. No.: 245,910

[22] Filed: May 19, 1994

[30] Foreign Application Priority Data

May 19, 1993 [JP] Japan .................. 5-139235

[51] Int. Cl.$^6$ .............. H04N 1/00; H04N 1/40; H04N 1/32
[52] U.S. Cl. .............. 358/404; 358/444; 358/468; 358/437; 358/442
[58] Field of Search .............. 358/404, 444, 358/468, 407, 437, 442, 296, 434, 436, 439

[56] References Cited

U.S. PATENT DOCUMENTS

| | | | |
|---|---|---|---|
| 4,371,754 | 2/1983 | De et al. | 395/182.08 |
| 4,539,636 | 9/1985 | Sääksjärvi | 395/421.01 |
| 4,652,933 | 3/1987 | Koshiishi | 358/256 |
| 5,177,620 | 1/1993 | Fukushima | 358/404 |
| 5,570,201 | 10/1996 | Yokota | 358/404 |

FOREIGN PATENT DOCUMENTS 0076494  10/1982  European Pat. Off. .

*Primary Examiner*—Edward L. Coles, Sr.
*Assistant Examiner*—Tia M. Harris
*Attorney, Agent, or Firm*—Sughrue, Mion, Zinn, Macpeak & Seas, PLLC

[57] ABSTRACT

A copying apparatus is connected to active and stand-by sections (11, 12) each of which has a specific data signal. The active section has a memory unit (14) for memorizing a plurality of data signals and an accessing unit (13) for accessing the memory unit to read one of the data signals as the specific data signal out of the memory unit in a readout operation. The accessing unit produces readout information which is representative of the readout operation. The copying apparatus comprises a memory section (23) of a first-in-first-out fashion that successively memorizes the specific data signal of the active section as a copied data signal up to a predetermined data number. A monitoring section (24) monitors the memory section to produce a monitored signal when the number of the copied data signals is equal to the predetermined data number. A control section (31) controls the memory section in response to the monitored signal and the readout information to make the memory section stop memorizing the specific data signal of the active section as the copied data signal.

4 Claims, 3 Drawing Sheets

COPYING APPARATUS FOR CARRYING OUT A COPYING OPERATION BETWEEN AN ACTIVE SECTION AND A STAND-BY SECTION

BACKGROUND OF THE INVENTION

This invention relates to a copying apparatus for copying a data signal as a copied data signal from a first data section to supply the copied data signal to a second data section.

In general, it is known that a data system comprises first and second data sections, each of which has a data signal. Such a data system may be used as a data exchange system. The first and the second data sections will be called first and second data processing sections, respectively. In the data system, one of the first and the second data processing sections serves as an active data processing section. Another one of the first and the second data processing sections serves as a stand-by data processing section.

The first data processing section comprises a first central processing unit (CPU), a first main memory, and at least one first peripheral device. The first CPU, the first main memory, and the first peripheral device are connected to one another by a first bus. Similarly, the second data processing section comprises a second CPU, a second main memory, and at least one second peripheral device. The second CPU, the second main memory, and the second peripheral device are connected to one another by a second bus.

It will be assumed that the first and the second data processing sections are operable as the active and the stand-by data processing sections, respectively. If the first data processing section is changed to the stand-by data processing section as a result of a condition of the first data processing section, the second data processing section is changed to the active data processing section. In order to continue processing in the second data processing section, it is necessary to make the content of the first main memory equal to that of the second main memory. Therefore, a conventional data system further comprises a copying apparatus for copying the contents of the first main memory as a copied data signal to the second main memory.

The copying apparatus is connected to the first and the second data processing sections. More particularly, the copying apparatus is connected to the first and the second buses. The copying apparatus comprises a first-in-first-out memory section that is capable of successively memorizing the data signal as a memorized data signal to a predetermined data number.

It will be assumed that the first and the second data processing sections are operable as the active and the stand-by data processing sections, respectively. In the active data processing section, the first CPU accesses the first main memory in order to read the data signal as a read data signal from the first main memory or in order to write the data signal as a written data signal to the first main memory. Each of the read and the written data signals may be called an access data signal. In the case where the first CPU accesses the first main memory, the copying apparatus receives the access data signal through the first bus to memorize the access data signal as the memorized data signal in the memory section. The copying apparatus monitors the second bus to detect whether or not the second bus is busy. When the second bus is not busy, the copying apparatus reads the memorized data signal from the memory section to supply the memorized data signal as an output data signal to the second main memory through the second bus. When the second bus is busy, the copying apparatus stops supply of the output data signal until the second bus is not busy.

As described above, the memory section is capable of successively memorizing the memorized data signals up to a predetermined data number. The number of memorized data signals may exceed the predetermined data number when the second bus continues to be busy. When the number of memorized data signals is equal to the predetermined data number, the copying apparatus produces a full-up signal and supplies it to the first CPU. Supplied with the full-up signal, the first CPU may stop accessing the first main memory. As a result, the first CPU may be put out of operation. Thus, it is difficult to normally carry out a copying operation in the conventional data processing system when the second bus continues to be busy.

SUMMARY OF THE INVENTION

It is therefore an object of this invention to provide a copying apparatus capable of normally carrying out a copying operation between an active section and a stand-by section.

Other objects of this invention will become clear as the description proceeds.

On describing the gist of this invention, it should at first be understood that a copying apparatus is connected to active and stand-by sections each of which has a specific data signal. The copying apparatus is for copying the specific data signal of the active section as a copied data signal. The active section comprises a memory unit for memorizing a plurality of data signals and an accessing unit for accessing the memory unit to read one of the data signals as the specific data signal from the memory unit in a readout operation. The accessing unit produces readout information which is representative of the readout operation. According to this invention, the copying apparatus comprises memory means for successively memorizing the specific data signal of the active section as the copied data signal up to a predetermined data number, monitoring means for monitoring the memory means to produce a monitored signal when the number of the copied data signals is equal to the predetermined data number, and control means responsive to the monitored signal and the readout information for controlling the memory means to make the memory means stop memorizing the specific data signal of the active section as the copied data signal.

DESCRIPTION OF THE PREFERRED EMBODIMENT

Figure 1:
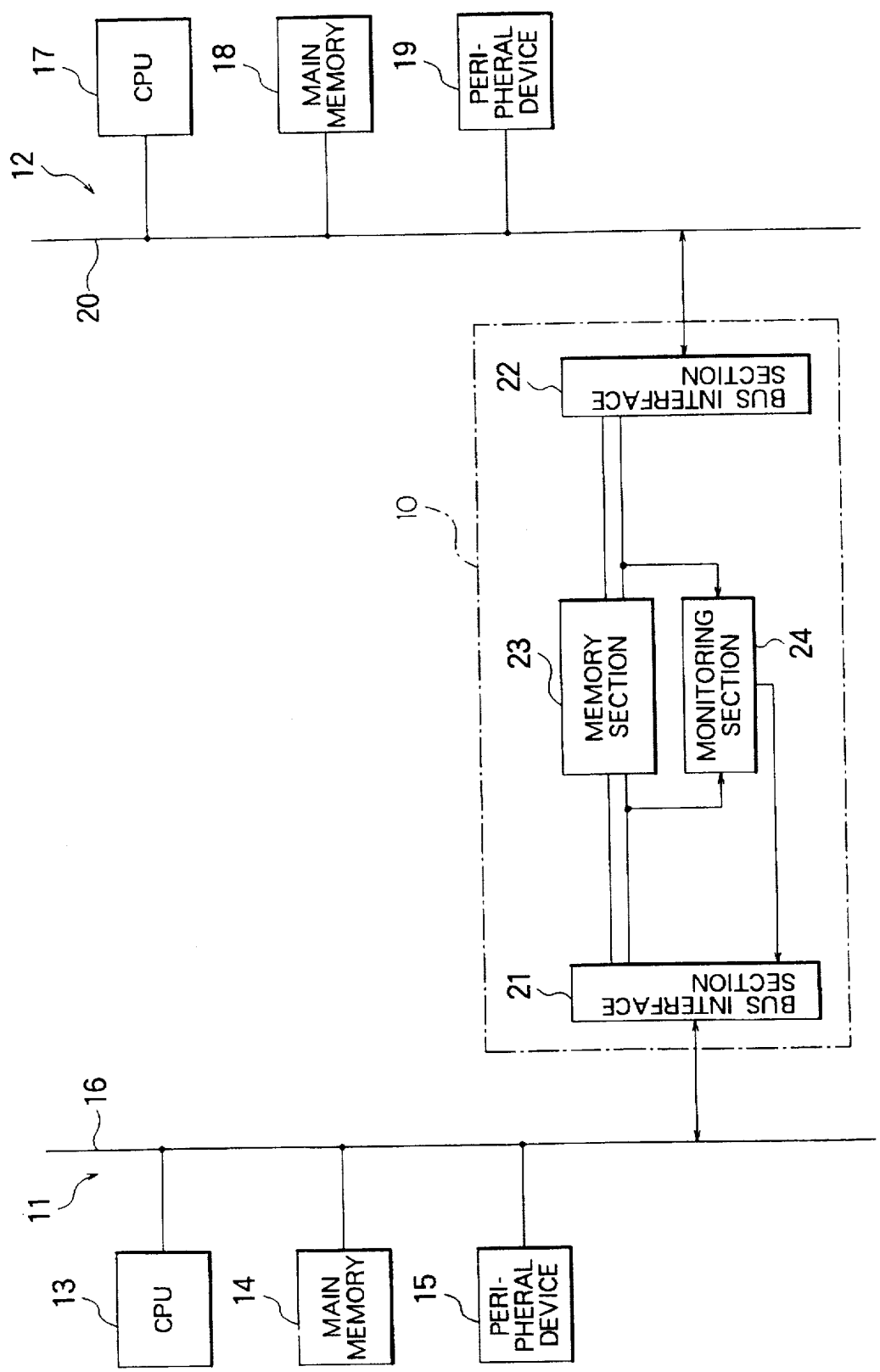
FIG. 1 is a block diagram of a conventional copying apparatus in addition to first and second data processing sections.

Referring to FIG. 1, a conventional copying apparatus will be described for a better understanding of this invention. The illustrated copying apparatus 10 may be used in combination with a data exchange system which comprises first and second data processing sections 11 and 12. One of the first and the second data processing sections 11 and 12 is operable as an active data processing section. Another of the first and the second data processing sections 11 and 12 is operable as a stand-by data processing section.

The first data processing section 11 comprises a first central processing unit (CPU) 13, a first main memory 14, and at least one first peripheral device 15 which may be, for example, a magnetic disk device. The first CPU 13, the first main memory 14, and the first peripheral device 15 are connected to one another by a first bus 16. Similarly, the second data processing section 12 comprises a second central processing unit (CPU) 17, a second main memory 18, and at least one second peripheral device 19 which may be, for example, a magnetic disk device. The second CPU 17, the second main memory 18, and the second peripheral device 19 are connected to one another by a second bus 20.

The copying apparatus 10 is located between the first data processing section 11 and the second data processing section 12. More particularly, the copying apparatus 10 is connected to the first and the second buses 16 and 20 and is for copying a data signal of the first data processing section 11 as a copied data signal and delivering the copied data signal to the second data processing section 12 when the first and the second data processing sections 11 and 12 are operable as the active and the stand-by data processing sections, respectively.

The copying apparatus 10 comprises first and second bus interface sections 21 and 22, a memory section 23 of a first-in-first-out type fashion, and a monitoring section 24. The memory section 23 and the monitoring section 24 are connected to the first bus interface section 21 which is connected to the first bus 16. Furthermore, the memory section 23 and the monitoring section 24 are connected to the second bus interface section 22 which is connected to the second bus 20.

It will be assumed that the first and the second data processing sections 11 and 12 are operable as the active and the stand-by data processing sections, respectively. In the first data processing section 11, the first CPU 13 carries out an access operation of the main memory 14 through the first bus 16. When the access operation is a write-in access, the first CPU 13 produces write-in access information which is representative of the write-in access and which has a write-in address signal and a data signal. The write-in access information is transferred on the first bus 16 in order to access the main memory 14 to write the data signal as a write-in data signal in the main memory 14 at a write-in position given by the write-in address signal.

The first bus interface section 21 receives the write-in access information to memorize the write-in access information as memorized write-in information in the memory section 23. When the memorized write-in information is memorized in the memory section 23, the second interface section 22 monitors the second bus 20 to detect whether or not the second bus is busy. When the second bus is not busy, the second interface section 22 reads the memorized information as output write-in information out of the memory section 23. The output information is representative of the write-in access and has an output address signal and an output data signal. The second interface section 22 accesses the second main memory 18 through the second bus 20 to write the output data signal in the second main memory 18 at the write position given by the output address signal. When the second bus is busy, the second interface section 22 waits to access the second main memory 18.

When the access operation is a readout access, the first CPU 13 produces readout access information which is representative of the readout access and which has a readout address signal. The readout access information is transferred on the first bus in order to access the main memory 14 to read the data signal of the main memory 14 as a readout data signal out of the main memory 14 at a readout position given by the readout address signal.

The first bus interface section 21 receives the readout access information and the readout data signal as readout information to memorize the readout information as a memorized readout information in the memory section 23.

When the second bus is not busy, the second interface section 22 reads the memorized readout information as output readout information out of the memory section 23. The output readout information is representative of the readout access and has the readout address signal and the readout data signal. Responsive to the readout address signal, the second interface section 22 accesses the second main memory 18 in accordance with the readout address signal through the second bus 20 to read the data signal as an output data signal out of the second main memory 18. The second interface section 22 judges whether or not the readout data signal is coincident with the output data signal. When the readout data signal is not coincident with the output data signal, the second interface section 22 accesses the second main memory 18 through the second bus 20 to write the readout data signal in the main memory 18 at the write-in position given by the readout address signal.

Now, each of the memorized write-in and the memorized readout information will be merely called memorized information.

The first interface section 21 supplies the access information every access operation so that the memory section 23 memorizes the access information as the memorized information. The memory section 23 successively memorizes the access information as the memorized information to a predetermined data number which is defined by the capacity of the memory section 23. As a result, the amount of the memorized access information may exceed the predetermined data number when the second bus 20 continues to be busy.

The copying apparatus further comprises a monitoring section 24 for monitoring the memory section 23. More particularly, the monitoring section 24 monitors whether or not the number of the memorized information exceeds the predetermined data number. When the number of memorized information is equal to the predetermined data number, the monitoring section 24 produces a full-up signal which is delivered from the first interface section 21 to the first CPU 13 through the first bus 16.

Supplied with the full-up signal, the first CPU 13 stops accessing the first main memory 14. As a result, it is difficult to normally carry out a copying operation in the copying apparatus 10 when the second bus 20 continues to be busy.

Figure 2:
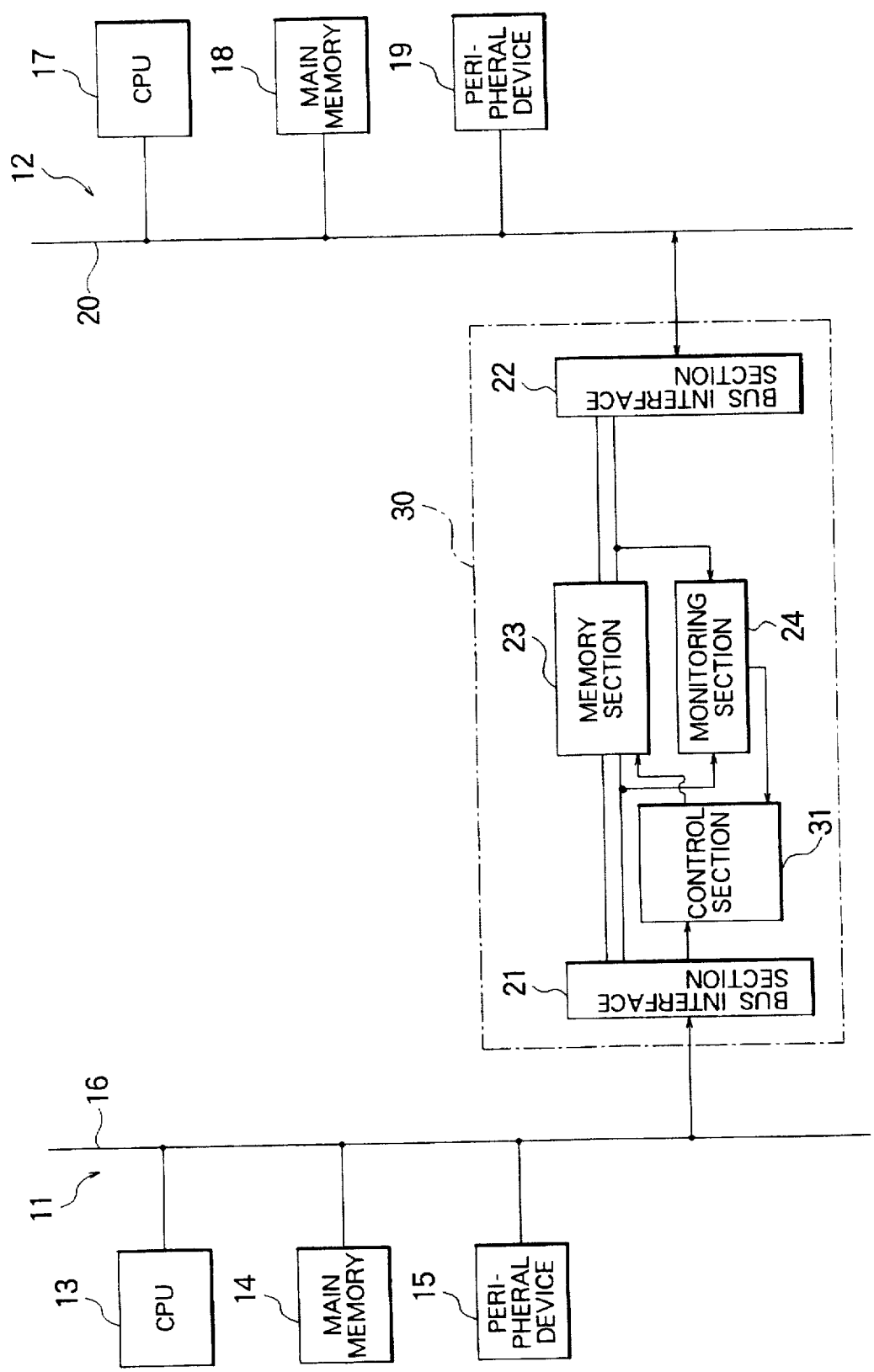
FIG. 2 is a block diagram of a copying apparatus according to a preferred embodiment of this invention in addition to first and second data processing sections.

Referring to FIG. 2, description will proceed to a copying apparatus of a preferred embodiment of this invention. The illustrated copying apparatus is different in structure from the copying apparatus 10 illustrated in FIG. 1 and is therefore designated afresh by a reference numeral 30. The copying apparatus 30 is for use in combination with the data processing system which comprises the first and the second data processing sections 11 and 12.

The copying apparatus 30 comprises similar parts to copying apparatus 10 of FIG. 1, which are designated by like reference numerals. The copying apparatus 30 further comprises a control section 31 which is connected to the first bus interface section 21, the memory section 23, and the monitoring section 24.

Now, it will be assumed that the first and the second data processing sections 11 and 12 are operable as the active and the stand-by data processing sections, respectively. In the first data processing section 11, the first CPU 13 carries out an access operation of the main memory 14 through the first bus 16.

On carrying out the access operation, the first CPU 13 produces access information which is representative of either one of a write-in access and a readout access. On carrying out the write-in access, the first CPU 13 produces write-in access information having a write-in address signal and a write-in data signal. The write-in access information is transferred on the first bus 16 in order to access the main memory 14 to write the write-in data signal in the main memory 14 in accordance with the write-in address signal.

Otherwise, the first CPU 13 produces readout access information having a readout address signal for carrying out readout access. The readout access information is transferred on the first bus 16 in order to access the main memory 14 to read the data signal of the first main memory 14 as a readout data signal out of the main memory 14 in accordance with the readout address signal.

When the access operation occurs on the first bus 16, the first bus interface section 21 receives the access information on the first bus 16. When the access information is the write-in access information, the first bus interface section 21 supplies the memory section 23 with the write-in address signal, the first write-in data signal, and a first identifier signal representative of the write-in access. Furthermore, the first bus interface section 21 supplies the control section 31 with the first identifier signal. When the access information is the readout access information, the first bus interface section 21 supplies the memory section 23 with the readout address signal, the readout data signal, and a second identifier signal representative of the readout access. Furthermore, the first bus interface section 21 supplies the control section 31 with the second identifier signal.

Responsive to the first identifier signal, the control section 31 produces a first write-in command signal as will be described hereinafter. Similarly, the control section 31 produces a second write-in command signal in response to the second identifier signal.

The write-in address signal, the write-in data signal, and the first identifier signal are memorized as a memorized write-in signal in the memory section 23 in accordance with the first write-in command signal. Similarly, the readout address signal, the readout data signal, and the second identifier signal are memorized as a memorized readout signal in the memory section in accordance with the second write-in command signal. Each of the memorized write-in and the memorized readout signals may be merely called a memorized signal.

As described above, the second bus interface section 22 monitors the second bus 20 to detect whether or not the second bus 20 is busy. When the second bus 20 is not busy, the second bus interface section 22 produces a readout command signal to read the memorized signal out of the memory section 23. The memorized signal is read as an output signal out of the memory section 23 to be supplied to the second bus interface section 22.

When the output signal is the memorized write-in signal, the second bus interface section 22 accesses the second main memory 18 through the second bus 20 to write the write-in data signal in the second main memory 18 in accordance with the write-in address signal.

When the output signal is the memorized readout signal, the second bus interface section 22 accesses the second main memory 18 through the second bus 20 to read a data signal memorized in the second main memory 18 as an output data signal in accordance with the readout address signal. The second bus interface section 22 judges whether or not the readout data signal is coincident with the output data signal. When the readout data signal is coincident with the output data signal, the second interface section 22 accesses the second main memory 18 in accordance with the readout address signal to write the readout data signal in the second main memory 18.

Attention will now be directed to the monitoring section 24. The monitoring section 24 is supplied with the first and the second write-in command signals from the control section 31. Furthermore, the monitoring section 24 is supplied with the readout command signal from the second bus interface section 22. The monitoring section 24 counts the number of the first and the second write-in command signals to produce write-in count value representative of the number of the first and the second write-in command signals. The monitoring section 24 further counts the number of the readout command signals to produce a readout count value representative of the number of the readout signals. The monitoring section 24 calculates a difference value between the write-in count value and the readout count value.

When the difference value is equal to a predetermined value which is defined by the capacity of the memory section 23, the monitoring section 24 produces an over-flow signal to supply the over-flow signal as the monitored signal to the control section 31.

Figure 3:
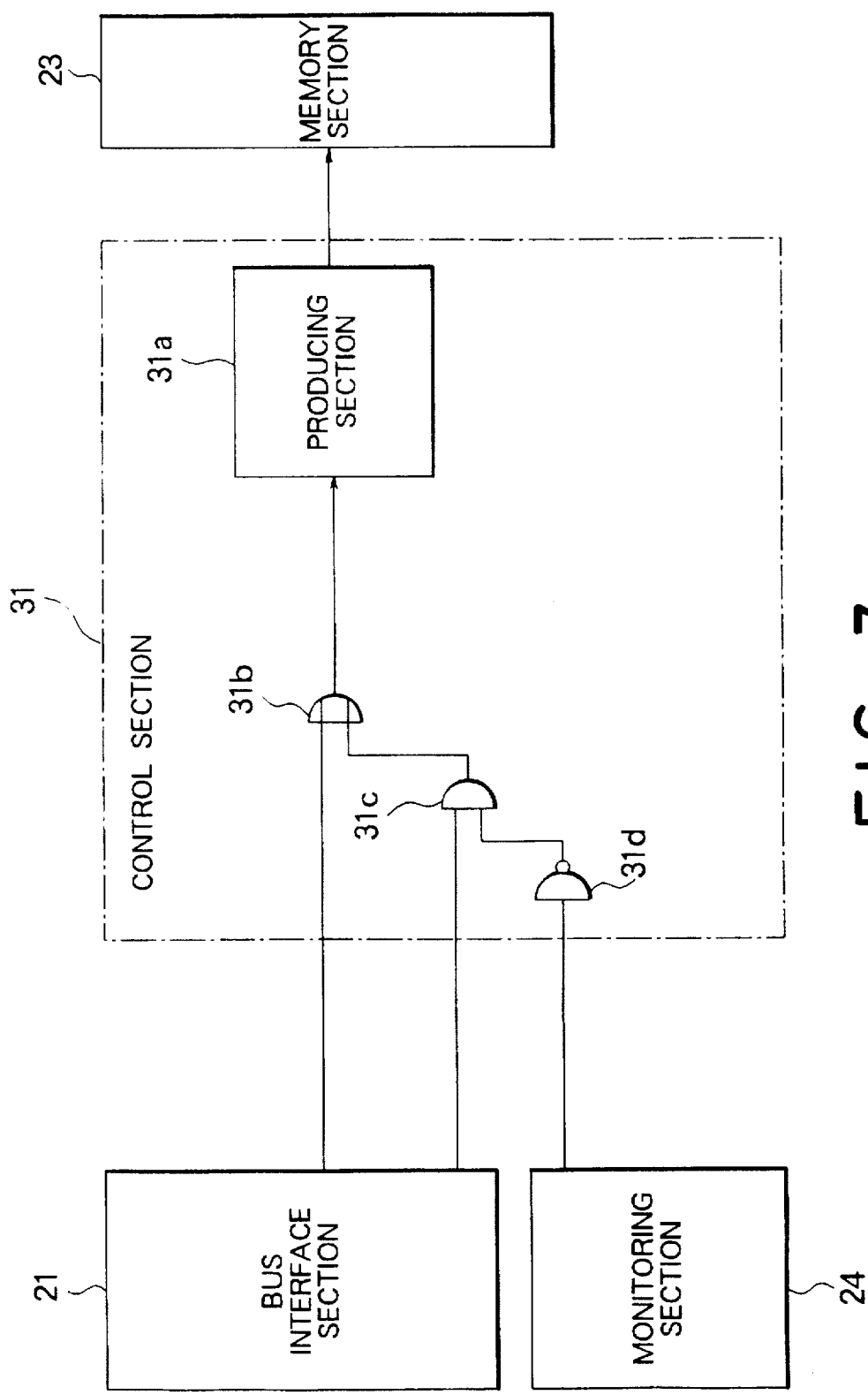
FIG. 3 is a block diagram of a copy mode control unit used in the copying apparatus illustrated in FIG. 2.

Referring to FIG. 3 in addition to FIG. 2, the control section 31 comprises a producing section 31a for producing the first and the second write-in command signals. As described above, the first bus interface section 21 supplies the first identifier signal to the control section 31 when the access information is the write-in access information. Otherwise, the first bus interface section 21 supplies the second identifier signal to the control section 31 when the access information is the readout access information.

The first identifier signal is delivered to an OR gate 31b. The second identifier signal is delivered to an AND gate 31c. In addition, the monitored signal is supplied from the monitoring section 24 to an inverter 31d. In the example being illustrated, each of the first and the second identifier signals and the monitored signal has a high level.

When the first identifier signal is supplied to the OR gate 31b, the OR gate 31b always produces an OR'ed signal having a high level to supply the OR'ed signal to the producing section 31a. Responsive to the OR'ed signal having the high level, the producing section produces the first write-in command signal to write the access information in the memory section 23.

When the second identifier signal is supplied to the AND gate 31c, the AND gate 31c produces an AND'ed signal having a high level as long as the monitoring section 24 does not produce the monitored signal. Therefore, the OR gate 31b produces the OR'ed signal having the high level in response to the AND'ed signal having the high level.

When the monitored signal is supplied to the inverter 31d, the inverter 31d produces a low level signal inasmuch as the monitored signal is a high level signal. Therefore, the AND gate 31c produces the AND'ed signal having a low level. Responsive to the AND'ed signal having the low level, the OR gate 31b produces the OR'ed signal having a low level.

Supplied with the OR'ed signal having the low level, the producing section 31a does not produce the second write-in command signal. As a result, the readout access information is not memorized in the memory section 23. As readily understood from the above description, the control section 31 controls the memory section 23 in response to the monitored signal to make the memory section 23 stop memorizing the readout access information.

What is claimed is:

1. A copying apparatus connected to active and stand=by sections, said active section comprising a memory unit for memorizing a plurality of data signals and an accessing unit for accessing said memory unit, said accessing unit accessing said memory unit in a write-in operation to write a write-in data signal to said memory unit, and accessing said memory unit in a readout operation to read out one of said data signals as a readout data signal from said memory unit, said copying apparatus copying each of said write-in and said readout data signals as a copied data signal to said stand-by section, said copying apparatus comprising:

memory means for memorizing up to a first predetermined number of each of said write-in data signal and said readout data signal as memorized signals;

readout means for reading out said memorized signals as an output data signal from said memory means and supplying said output data signal to said stand-by section; and control means for causing said memory means to stop memorizing said readout data signal when the number of said memorized signals in said memory means is a second predetermined number greater than the number of said memorized signals in said output data signal.

2. A copying apparatus as claimed in claim 1, wherein said control means produces a first write-in command in response to said write-in operation and produces a second write-in command in response to said readout operation;

said memory means being responsive to said first write-in command to memorize said write-in data signal as said memorized signals, said memory means being responsive to said second write-in command to memorize said readout data signal as said memorized signals.

3. A copying apparatus as claimed in claim 2, wherein said readout means produces a readout command to read said memorized signals as said output data signal out of said memory means.

4. A copying apparatus as claimed in claim 3, wherein said copying apparatus further comprises:

counting means responsive to said first and said second write-in commands for counting the number of said first and said second write-in commands to produce a write-in count value, said counting means being responsive to said readout command for counting the number of said readout commands to produce a readout count value, said counting means calculating a difference value between said write-in count value and said readout value to produce an over-flow signal as a monitored signal when said difference value is equal to said first predetermined number;

said control means being responsive to said monitored signal for causing said memory means to stop memorizing said readout data signal.

* * * * *